United States Patent Office 3,649,554
Patented Mar. 14, 1972

3,649,554
PHOSPHOR COMPOSITIONS AND PROCESSES
FOR PRODUCING SAME
David A. Grisafe, Lawrence, Kans., assignor to Sylvania
Electric Products Inc.
Continuation-in-part of application Ser. No. 834,905,
June 19, 1969. This application Nov. 16, 1970, Ser.
No. 89,624
Int. Cl. C09k 1/54
U.S. Cl. 252—301.6 F
8 Claims

ABSTRACT OF THE DISCLOSURE

A phosphor composition is disclosed that can be represented by the formula:

$$x(Li_2O).y(ZnO).3GeO_2:zMn$$

wherein $x+y+z$ is from greater than about 1.9 to 2, $x$ and $y$ are each from 0.9 to 1.0, $x+y$ is at least 1.9 and $z$ is from about 0.001 to 0.1. A process is disclosed that comprises forming a mixture of appropriate metal sources and heating the mixture under controlled condition to produce the phosphor compositions of this invention.

CROSS-REFERENCE TO RELATED APPLICATION

This application is a continuation-in-part of application Ser. No. 834,905, filed June 19, 1969, now abandoned.

BACKGROUND OF THE INVENTION

This invention relates to phosphor compositions. More particularly, it relates to lithium zinc germanate phosphor compositions having a pseudospinel crystal structure that is activated by manganese.

Phosphor compositions, that is composition that upon excitation by certain media such as daylight, ultraviolet light, cathode rays, X-rays and the like, emit light in a relatively narrow band in the visible spectra, have many uses in various displays. Related materials are known such as manganese-activated zinc germanate, beryllium germanate, magnesium germanate, zinc magnesium germanate and zinc magnesium germanate-silicate. Furthermore, the host is known, however in phosphor chemistry there are always infinite possibilities of activators and host materials. It is generally not possible to determine in advance of the actual preparation thereof that a particular combination of host and activator will yield luminescence under a particular excitation media. For example, in many phosphors calcium and strontium are suitable cations in the hot of halophosphates when activated by antimony and manganese, however, barium, generally considered equivalent to calcium and strontium in many instances is not effective as a cation for the same anion and activators. Similarly, identical materials that will yield luminescence under some excitation media such as electroluminescent phosphor are not photoluminescent. It is, therefore, necessary in most instances to discover their characteristics and proportions to determine the actual phosphor composition. For example, activators can be either "original" activators or "intensifiers." Where there are emission lines of the host these lines will disappear if the activator material is an "original" activator. The same activator material with a different host, however, can intensify the original emission lines, thus is an "intensifier." Of course, if the original material is non-luminescent and luminescent with the addition of an activator, the activator is an "original" activator. Additionally, similar hosts, that is, hosts that are generally considered to be chemically equivalent activated with different elements also considered to chemical equivalents can give completely different results. For example, certain excitation media at a given level of metals of a given series such as the rare earths will result in emission with two similar host materials that are similar such as rare earth vanadates and oxides except for one metal of the series which is an activator for one host and not for the similar host. For example, dysprosium, europium and thulium as activators for both yttrium vanadate and yttrium oxide give yellow, red and green emission respectively while terbium gives green emission in yttrium oxide and is not an activator for yttrium vanadate.

It is believed, therefore, a new phosphor composition is an advancement in the art.

SUMMARY OF THE INVENTION

In accordance with one aspect of this invention, there is provided a new phosphor composition having a pseudospinel crystal structure and having the formula:

$$x(Li_2O).y(ZnO).3GeO_2:zMn$$

wherein $x+y+z$ is from greater than about 1.9 to about 2, $x$ and $y$ are each from 0.9 to 1.0, the values of $x+y$ is at least 1.9 and $z$ is from greater than about 0.001 to 0.1.

The phosphors of this invention are prepared by (a) forming a mixture of the appropriate metal sources and a germanium source, the molar ratio of said metal to germanium in said mixture being:

Li$_2$ from 0.9:3 to 1:3
Zn from 0.9:3 to 1:3
Mn from 0.001:3 to 0.1:3

(b) heating said mixture to at least 800° C. and below 1000° C. for a time sufficient to form a luminescent composition having a pseudospinel crystal structure of the present invention.

For a better understanding of the present invention, together with other and further objects, advantages, and capabilities thereof, reference is made to the following disclosure and appended claims in connection with the above description of some of the aspects of the invention.

DESCRIPTION OF THE PREFERRED EMBODIMENTS

The beforementioned lithium zinc germanate is not a true spinel since true spinel structures would have kkl values for a given reflectance of all odd or all even. The X-ray diffraction pattern given in Table I shows that mixed kkl values are obtained. However, the strongest reflections are those having kkl values all add or all even. Therefore, the structure is related to that of a spinel and will be referred to herein as pseudospinel.

Figure 1:
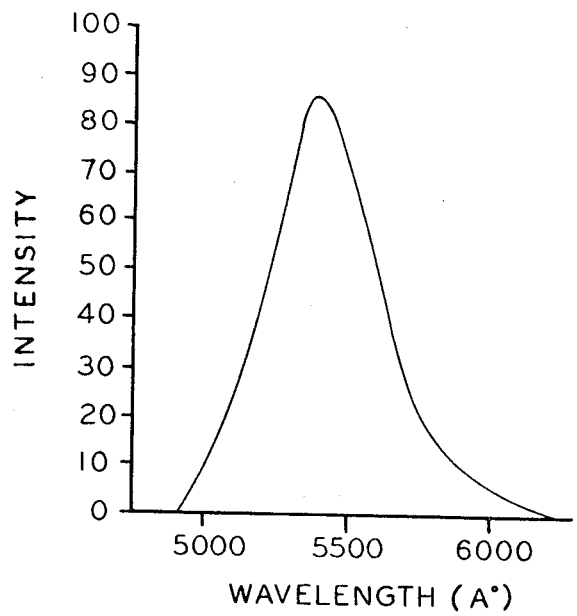
FIG. 1 is the emission spectra of the material of this invention under 2537 A.
Figure 2:
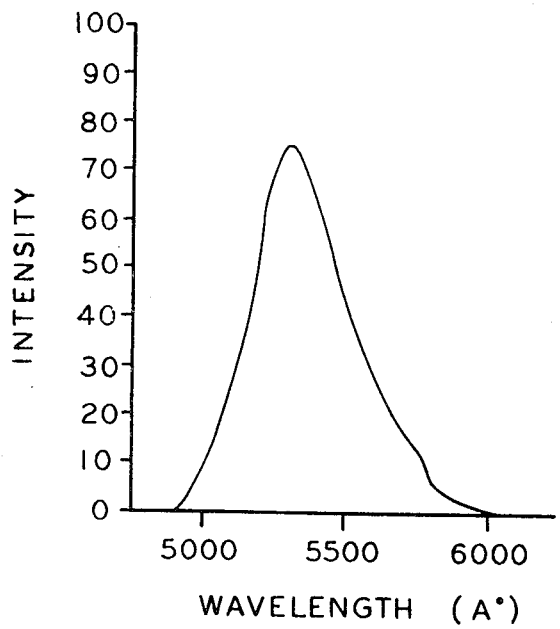
FIG. 2 is the emission spectra of the material of this invention under cathode ray excitation.

Although the pseudospinel lithium zinc germanate is self-activating and yields a blue luminescence without an activator, the manganese operates as an original activator as opposed to an intensifier as is apparent from the emission spectra, see FIG. 1 and FIG. 2.

To achieve an activator level, it is necessary to incorporate sufficient manganese wherein in the formula $$x(Li_2O).y(ZnO).3GeO_2:zMn$$

$z$ is at least 0.001 and can vary up to about 0.1.

The manganese activator does not necessarily replace stoichiometric amounts of either lithium or zinc, therefore, in the formula $x(Li_2O) \cdot y(ZnO) \cdot 3GeO_2:zMn$, $z$ is greater than 0 to 0.1 and $x+y$ is at least 1.9 while $x+y+z$ can vary from greater than about 1.9 to 2.

As previously mentioned, a mixture of germanium source and the appropriate metal sources of lithium, zinc and manganese sources, is formed. These other metal and germanium sources can be the salts of various metals that are thermal sensitive that is, salts that will form the corresponding oxides when heated under non-reducing atmospheric conditions. Typical examples of useful salts are the carbonates, nitrates, acetates, oxalates, sulfates and the like. Additionally, the metal source materials can include the metal oxides per se such as zinc oxide, lithium oxide and magnesium oxide. Germanium oxide is preferred as a germanium source. Thus, metal sources can be either the thermal sensitive metal salts, that is, those that will form oxides under heat or metallic oxides. Any convenient method can be used to form a relatively uniform mixture such as by dry mixing in conventional dry mixers or by using a volatile inert carrier such as acetone to aid in dispersion of the various solids.

After the mixture is formed, it is heated to at least about 600° C. to about 800° C. for a period of at least about one hour, to insure essentially all of the metal salts have dissociated to form the metal oxides. Thereafter, the mixture of oxide is preferably cooled and remixed, and then reheated to at least 800° C. for a period of time sufficient to form a pseudospinel lattice to achieve the best results. The additional cooling and remixing and reheating steps are not essential,, however, better performance is achieved in this manner. Generally, several hours are required to form the pseudospinel crystal at a temperature of about 800° C. Higher temperatures, that is, up to about 950° C. can be used and less time is required. Temperatures above about 1000° C. are not used since the compositions can melt and dissociate. Additionally, after the phosphor has been prepared, the brightness can be improved by refiring in a milding reducing atmosphere, as for example, in a nitrogen-hydrogen atmosphere or carbon-monoxide-nitrogen atmosphere and the like.

To further illustrate the invention, the following non-limiting examples are presented. All parts, proportions and percentages are by weight unless otherwise indicated.

EXAMPLE I 2.9556 g. of $Li_2Cl_3$, 5.0156 g. $ZnCO_3$, and 12.5520 g. of $GeO_2$ are mixed dry and heated to about 600–800° C. The material is cooled to room temperature (about 20–25° C.), remixed and refired at 800–950° C. for about 20 hours until the spinel lattice has formed. The material fluoresces light blue under 2537 A. and deep blue under cathode rays. The material has the empirical formula, $Li_2ZnGe_3O_8$ or $Li_2O \cdot ZnO \cdot 3GeO_2$.

A sample of the material is subjected to X-ray diffraction analysis. In Table 1, the relative intensities, I, and hkl values for the various X-ray diffraction peaks for the novel lithium zinc germanate phosphor of the present invention are given: (obtained with reference to $2\theta$ values for $CuK_{\alpha}$ radiation).

TABLE 1

| D | I | hkl |
|---|---|---|
| 5.79 | MW | 110 |
| 4.72 | S | 111 |
| 3.66 | M | 210 |
| 3.34 | MW | 211 |
| 2.89 | MW | 220 |
| 2.59 | VW | 310 |
| 2.47 | VS | 311 |
| 2.36 | W | 222 |
| 2.27 | VW | 320 |
| 2.19 | VW | 321 |
| 2.05 | M | 400 |
| 1.931 | W | 411, 330 |
| 1.878 | W | 331 |
| 1.787 | W | 421 |
| 1.672 | W | 422 |
| 1.606 | W | 510, 431 |
| 1.576 | M | 510, 333 |
| 1.521 | W | 520, 432 |
| 1.495 | W | 521 |
| 1.447 | S | 440 |

X-ray powder data for $Li_2ZnGe_3O_8$ are presented in Table 1. The compound possesses a pseudospinel structure with a lattice parameter of $a0=8.191\pm0.001$ A. The 0 0 1 reflections are only present when $1=4n$ which indicates the space group is $P4_332$ or $P4_132$. In general, the strongest reflections are those whose Miller indices are all odd or all even thus suggesting a relation to the spinel structure.

Unactivated $Li_2ZnGe_3O_8$ is a white material with a melting point of 1000° C.$\pm$10° C. Assuming a spinel structure (Z=4) the material possesses an X-ray density of 5.13 g./cm.$^3$ compared to a picnometric density of 5.0 g./cm.$^3$.

EXAMPLE II 3.5098 g. $Li_2CO_3$, 6.2695 g. $ZnCO_3$, 0.2874 g. $MnCO_3$ and 15.690 g. $GeO_2$ are mixed in acetone, fired at about 750° for about 12 hours, remixed and refired at about 850–950° C. for about 12 hours. The material is then heated at about 850° C. for about 1–2 hours in a nitrogen-carbon monoxide atmosphere. The resulting phosphor luminesces green under 2537 A. and cathode ray excitation and bluish green under 3650 A. excitation. The material has the empirical formula of

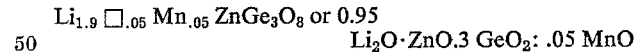

Li$_{1.9}$ □$_{.05}$ Mn$_{.05}$ ZnGe$_3$O$_8$ or 0.95 Li$_2$O·ZnO.3 GeO$_2$: .05 MnO

Using —325 mesh material, emission spectra under 2537 A. were obtained from a Perkin Elmer Spectrophotofluorimeter (Model #195 and under cathode ray excitation were obtained with a Jerrell Ash Spectrometer (Model #78-496).

The emission spectrum of the $Li_2ZnGe_3O_8$:Mn under 2537 A. excitation is shown in FIG. 1. The presence of only a green emission band indicates that manganese is an "original" activator since unactivated material emission is blue.

The emission spectrum of the material under cathode ray excitation is shown in FIG. 2. The green emulsion is silimar to that under 2537 A. excitation.

Substantially similar results are achieved when the stoichiometric levels of $Li_2CO_3$ and $ZnCO_3$ are reversed, that is, when the molar ratio of lithium carbonate to germanium dioxide is about 1:1 and the molar ratio of zinc carbonate to germanium dioxide is about 0.95:1.

While there has been shown and described what is at present considered the preferred embodiments of the invention, it will be obvious to those skilled in the art that various changes and modifications may be made therein without departing from the scope of the invention as defined by the appended claims.

I claim:
1. A phosphor composition having a pseudospinel crystal structure and defined by the formula

$$x(Li_2O) \cdot y(ZnO) \cdot 3GeO_2 : zMn$$

wherein $x+y+z$ is from greater than about 1.9 to 2, $x$ and $y$ are each from 0.9 to 1.0, $x+y$ is at least 1.9 and $z$ is from greater than 0.001 to 0.1.

2. A phosphor composition according to claim 1 wherein $x$ is 1, $y$ is less than 1.0.

3. A phosphor composition according to claim 1 wherein $y$ is 1, $x$ is less than 1.0.

4. A phosphor composition according to claim 1 wherein $x$ and $y$ are each less than 1.

5. A process comprising:
  (a) forming a mixture of metal sources and germanium sources selected from the group consisting of lithium oxide, zinc oxide, manganese oxide, germanium oxide and thermal sensitive lithium, zinc, manganese and germanium salts that form oxides when heated in a non-reducing atmosphere at processing temperatures and mixtures thereof, the molar ratio of said metals to germanium in said mixture being
    $Li_2$ from 0.9:3 to 1:3
    Zn from 0.9:3 to 1:3
    Mn from .001:3 to 0.1:3, and
  (b) heating said mixture to at least 800° and below about 1000° C. for at least about one hour to form a pseudospinel crystalline form a lithium zinc germanate represented by the formula:

$$x(Li_2O) \cdot y(ZnO) \cdot 3GeO_2 : zMn$$

wherein $x+y+z$ is from greater than about 1.9 to about 2, $x$ and $y$ are each from 0.9 to 1.0 $x+y$ is at least 1.9 and $z$ is from greater than 0.001 to 0.1.

6. A process according to claim 5 wherein said mixture is cooled to about room temperature and reheated to at least about 800° C. and less than about 950° C.

7. A process according to claim 6 wherein said mixture is prepared by slurrying said metal sources and germanium source is acetone.

8. A process according to claim 7 wherein said metal sources are metal carbonates and said germanium source is germanium oxide.

References Cited

UNITED STATES PATENTS 3,420,781    1/1969    McAllister    252—301.4 F
2,615,850    10/1952    McKeag    252—301.6 F

OTHER REFERENCES

Duhlb et al.: "Compt. Rend.," vol. 255, 2471-3 (1962).

TOBIAS E. LEVOW, Primary Examiner

J. COOPER, Assistant Examiner

UNITED STATES PATENT OFFICE
CERTIFICATE OF CORRECTION

PO-1050 (5/69)

Patent No. 3,649,554     Dated March 14, 1972

Inventor(s) DAVID A. GRISAFE

It is certified that error appears in the above-identified patent and that said Letters Patent are hereby corrected as shown below:

Col. 1, line 51 - "hot" should read "host" - -

Col. 2, line 35 - "metal" should read "metals" - -

Col. 3, line 1 - "add" should read "odd" - -

Col. 4, line 26 - "a0" should read "$a_o$" - -

Col. 6, Claim 5, line 1 - "a" second instance should read "of" - -

Col. 6, Claim 7, line 3 - "is" should read "in" - -

Signed and sealed this 12th day of September 1972.

(SEAL)
Attest:

EDWARD M. FLETCHER, JR.
Attesting Officer

ROBERT GOTTSCHALK
Commissioner of Patents